United States Patent
Kwon et al.

(10) Patent No.: US 9,130,235 B2
(45) Date of Patent: *Sep. 8, 2015

(54) CABLE-TYPE SECONDARY BATTERY CAPABLE OF WIRELESS CHARGE

(71) Applicant: LG Chem, Ltd., Seoul (KR)

(72) Inventors: Yo-Han Kwon, Daejeon (KR); Hye-Ran Jung, Daejeon (KR); Sang-Wook Woo, Daejeon (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,443

(22) Filed: Apr. 9, 2014

(65) Prior Publication Data

US 2014/0220400 A1 Aug. 7, 2014

Related U.S. Application Data

(63) Continuation of application No. PCT/KR2013/010427, filed on Nov. 15, 2013.

(30) Foreign Application Priority Data

Nov. 15, 2012 (KR) .................. 10-2012-0129645

(51) Int. Cl.
*H01M 10/0565* (2010.01)
*H01M 10/0564* (2010.01)
*H01M 10/02* (2006.01)
*H01M 10/05* (2010.01)
*H01M 10/056* (2010.01)
(Continued)

(52) U.S. Cl.
CPC .............. *H01M 10/02* (2013.01); *H01M 10/05* (2013.01); *H01M 10/056* (2013.01); *H01M 10/44* (2013.01); *H02J 7/025* (2013.01)

(58) Field of Classification Search
None
See application file for complete search history.

(56) References Cited

U.S. PATENT DOCUMENTS

2002/0187372 A1* 12/2002 Hall et al. .................. 429/7
2004/0013944 A1 1/2004 Lee et al.
(Continued)

FOREIGN PATENT DOCUMENTS

| CN | 101107736 A | 1/2008 |
|---|---|---|
| CN | 102484243 A | 5/2012 |

(Continued)

OTHER PUBLICATIONS

Written Opinion of the International Searching Authority for PCT/KR2013/010427 dated Mar. 17, 2014.

*Primary Examiner* — Cynthia K Walls
(74) *Attorney, Agent, or Firm* — Lerner, David, Littenberg, Krumholz & Mentlik, LLP

(57) ABSTRACT

The present invention provides a cable-type secondary battery capable of wireless charge. The cable-type secondary battery according to the present invention can be applied in a wireless charging method, thereby being conveniently charged as compared with conventional batteries which are charged with wires, and has an outer current collector configured in a wound form, which can overcome the problem of local charge caused by the shape of conventional cable-type batteries. Also, the outer current collector configured in a wound form acts as a current of electrodes, and also can act as a charger which generates a current by external magnetic field, thereby simplifying battery configuration.

25 Claims, 3 Drawing Sheets

(51) Int. Cl.
*H01M 10/44* (2006.01)
*H02J 7/02* (2006.01)

(56) References Cited

U.S. PATENT DOCUMENTS

| | | |
|---|---|---|
| 2007/0243456 A1 | 10/2007 | Ahn et al. |
| 2008/0137890 A1 | 6/2008 | Petersen et al. |
| 2010/0203372 A1 | 8/2010 | Kim et al. |
| 2011/0025274 A1 * | 2/2011 | Kunkel et al. ............... 320/135 |
| 2011/0117414 A1 | 5/2011 | Choi et al. |
| 2012/0009331 A1 | 1/2012 | Kwon et al. |
| 2012/0100412 A1 | 4/2012 | Kwon et al. |

FOREIGN PATENT DOCUMENTS

| | | |
|---|---|---|
| JP | 08-088019 | 4/1996 |
| KR | 20040006781 A | 1/2004 |
| KR | 100725892 B1 | 9/2006 |
| KR | 20090009598 A | 1/2009 |
| KR | 20120019269 A | 3/2012 |

* cited by examiner

CABLE-TYPE SECONDARY BATTERY CAPABLE OF WIRELESS CHARGE

CROSS-REFERENCE TO RELATED APPLICATION

This application is a continuation of International Application No. PCT/KR2013/010427 filed on Nov. 15, 2013, which claims priority under 35 USC 119(a) to Korean Patent Application No. 10-2012-0129645 filed in the Republic of Korea on Nov. 15, 2012, the disclosures of which are incorporated herein by reference.

TECHNICAL FIELD

The present invention relates to a cable-type secondary battery, which can freely change in shape, and more particularly to a cable-type secondary battery capable of wireless charge.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NIMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape. To fulfill this need, suggestions have been made to develop linear batteries having a very high ratio of length to cross-sectional diameter.

The linear batteries consist of electrodes and current collectors which have relatively very large surface area relative to the volume of the batteries, thereby causing difficulties in the flow of electrons, as compared with other kinds of batteries which have been generally used.

For this reason, when the linear batteries are charged by a conventional charging method using wires, charging may be carried out only in a contact site between an external wire and a current collector, rather than the whole electrodes within the batteries. Also, in the case of high speed charging with high current density, the influence of resistance may relatively increase to reduce an effect of charging.

DISCLOSURE

Technical Problem

The present invention is designed to solve the above-mentioned problems, and therefore it is directed to providing a cable-type secondary battery which can be wirelessly charged by inducing a current within the battery without wires, instead of a conventional charging method using wires.

Technical Solution

In accordance with one aspect of the present invention, there is provided a cable-type secondary battery capable of wireless charge, configured to have a horizontal cross section of a predetermined shape and to extend longitudinally and comprising: a core for supplying lithium ions, which comprises an electrolyte; an inner electrode comprising an open-structured inner current collector surrounding the outer surface of the core for supplying lithium ions, and an inner electrode active material layer surrounding the surface of the inner current collector; a separation layer surrounding the outer surface of the inner electrode to prevent a short circuit between electrodes; an outer electrode surrounding the outer surface of the separation layer and comprising an outer electrode active material layer and an outer current collector configured in a wound form; and a connector having a diode which electrically connects the inner current collector and the outer current collector therebetween.

The diode of the connector may be reversely connected from a high potential current collector being the inner current collector or the outer current collector to a low potential current collector being the outer current collector or the inner current collector.

When the inner electrode is a cathode and the outer electrode is an anode, the diode of the connector may be reversely connected from the inner current collector to the outer current collector. Alternatively, when the outer electrode is a cathode and the inner electrode is an anode, the diode of the connector may be reversely connected from the outer current collector to the inner current collector.

In the present invention, the electrolyte used in the core for supplying lithium ions may include a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PMMA, PAN, or PVAc; and a solid electrolyte using PEO, polypropylene oxide (PPO), polyether imine (PEI), polyethylene sulphide (PES), or polyvinyl acetate (PVAc).

The electrolyte further comprises a lithium salt.

Examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

In the present invention, the open-structured inner current collector may be in the form of a wound wire, a wound sheet or a mesh.

The inner current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

The conductive material may be selected from polyacetylene, polyaniline, polypyrrole, polythiophene, polysulfurnitride, indium tin oxide (ITO), silver, palladium, nickel, and a mixture thereof.

The conductive polymer may be selected from polyacetylene, polyaniline, polypyrrole, polythiophene, polysulfurnitride, and a mixture thereof.

Meanwhile, the separation layer may be an electrolyte layer or a separator.

The electrolyte layer may comprise an electrolyte selected from a gel polymer electrolyte using PEO, PVdF, PMMA, PAN, or PVAc; and a solid electrolyte using PEO, polypropylene oxide (PPO), polyether imine (PEI), polyethylene sulphide (PES), or polyvinyl acetate (PVAc).

The electrolyte layer may further comprise a lithium salt.

The lithium salt may be selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

The separator may be a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; or a porous substrate made of a mixture of inorganic particles and a binder polymer.

In the outer electrode, the outer electrode active material layer may be formed to surround the outer surface of the separation layer, and the outer current collector may be formed by winding to surround the outer surface of the outer electrode active material layer; the outer current collector may be formed by winding to surround the outer surface of the separation layer, and the outer electrode active material layer may be formed to surround the outer surface of the outer current collector; the outer current collector may be formed by winding to surround the outer surface of the separation layer, and the outer electrode active material layer may be formed to surround the outer surface of the outer current collector and come into contact with the separation layer; or the outer electrode active material layer may be formed to surround the outer surface of the separation layer, and the outer current collector may be formed by winding to be included inside the outer electrode active material layer by being covered therein and to surround the outer surface of the separation layer with spacing apart therefrom.

In the present invention, the outer current collector may be in the form of a wound wire or a wound sheet.

The outer current collector may be made of stainless steel, aluminum, nickel, titanium, sintered carbon, or copper; stainless steel treated with carbon, nickel, titanium or silver on the surface thereof; or an aluminum-cadmium alloy.

The outer current collector may have a thickness of 1 to 500 μm.

Also, the outer current collector may be wound in a frequency of 0.1 to 100 times per 1 mm of a unit length in the cable-type secondary battery.

In the present invention, the inner electrode may be an anode and the outer electrode may be a cathode, or the inner electrode may be a cathode and the outer electrode may be an anode.

When the inner electrode of the present invention is an anode and the outer electrode is a cathode, the inner electrode active material layer may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and mixtures thereof, and the outer electrode active material layer may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0\leq x<0.5$, $0\leq y<0.5$, $0\leq z<0.5$, and $x+y+z\leq 1$), and mixtures thereof.

Alternatively, when the inner electrode is a cathode and the outer electrode is an anode, the inner electrode active material layer may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0\leq x<0.5$, $0\leq y<0.5$, $0\leq z<0.5$, and $x+y+z\leq 1$), and mixtures thereof, and the outer electrode active material layer may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and mixtures thereof.

In addition, in accordance with another aspect of the present invention, there is provided a cable-type secondary battery capable of wireless charge, configured to have a horizontal cross section of a predetermined shape and to extend longitudinally and comprising: two or more cores for supplying lithium ions, which comprise an electrolyte; two or more inner electrodes arranged in parallel to each other, each inner electrode comprising an open-structured inner current collector surrounding the outer surface of each core for supplying lithium ions, and an inner electrode active material layer surrounding the surface of the inner current collector; a separation layer surrounding the outer surface of the inner electrode to prevent a short circuit between electrodes; an outer electrode surrounding the outer surface of the separation layer and comprising an outer electrode active material layer and an outer current collector configured in a wound form; and a connector having a diode which electrically connects the inner current collector and the outer current collector therebetween.

Further, in accordance with still another aspect of the present invention, there is provided a cable-type secondary battery capable of wireless charge, configured to have a horizontal cross section of a predetermined shape and to extend longitudinally and comprising: two or more cores for supplying lithium ions, which comprise an electrolyte; two or more inner electrodes arranged in parallel to each other, each inner electrode comprising an open-structured inner current collector surrounding the outer surface of each core for supplying lithium ions, an inner electrode active material layer surrounding the surface of the inner current collector, and a separation layer surrounding the outer surface of the inner electrode active material layer to prevent a short circuit between electrodes; an outer electrode surrounding the outer surface of the inner electrodes and comprising an outer electrode active material layer and an outer current collector configured in a wound form; and a connector having a diode which electrically connects the inner current collector and the outer current collector therebetween.

Advantageous Effects

The cable-type secondary battery according to the present invention can be applied in a wireless charging method, thereby being conveniently charged as compared with conventional batteries which are charged with wires.

Also, the cable-type secondary battery according to the present invention has an outer current collector configured in a wound form, which can overcome the problem of local charge caused by the shape of conventional cable-type batteries.

Further, the outer current collector configured in a wound form acts as a current of electrodes, and also can act as a charger which generates a current by external magnetic field, thereby simplifying battery configuration.

DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

EXPLANATION OF REFERENCE NUMERALS

Figure 1:
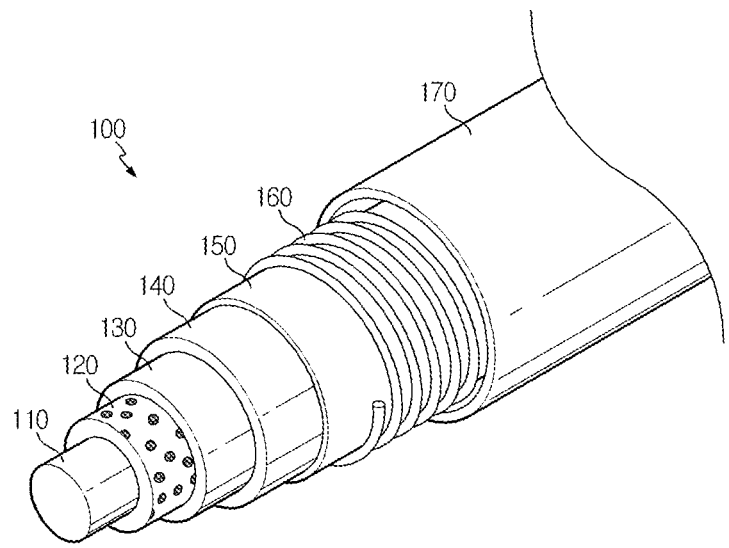
FIG. 1 shows a cable-type secondary battery having one inner electrode configured in a mesh form in accordance with one embodiment of the present invention.

100, 200, 300, 400: Cable-type secondary battery
110, 210, 310, 410: Core for supplying lithium ions
120, 220, 320, 420: Inner current collector
130, 230, 330, 430: Inner electrode active material layer
140, 240, 340, 440: Separation layer
150, 250, 350, 450: Outer electrode active material layer
160, 260, 360, 460: Outer current collector
170, 270, 370, 470: Protection coating Best Mode Hereinafter, the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The configurations illustrated in the drawings and the embodiments are just preferable examples for the purpose of illustrations only, not intended to limit the scope of the disclosure, so it should be understood that other equivalents and modifications could be made thereto without departing from the spirit and scope of the disclosure.

Figure 2:
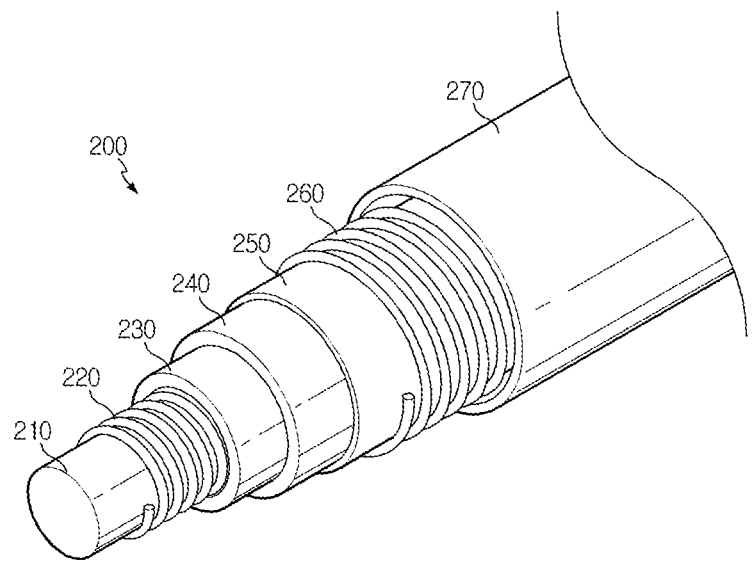
FIG. 2 shows a cable-type secondary battery having one inner electrode configured in a wound wire form in accordance with one embodiment of the present invention.

FIG. 1 shows a cable-type secondary battery having one inner electrode configured in a mesh form in accordance with one embodiment of the present invention, and FIG. 2 shows a cable-type secondary battery having one inner electrode configured in a wound wire form in accordance with one embodiment of the present invention.

Figure 3:
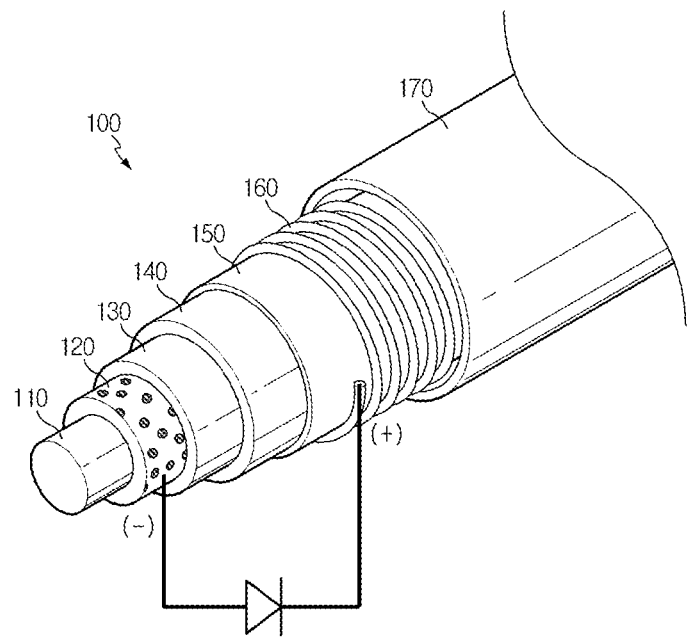
FIG. 3 is a schematic view of a connector having a diode which is electrically connected between an inner current collector and an outer current collector in a cable-type secondary battery according to one embodiment of the present invention, which is shown by a symbol.
Figure 4:
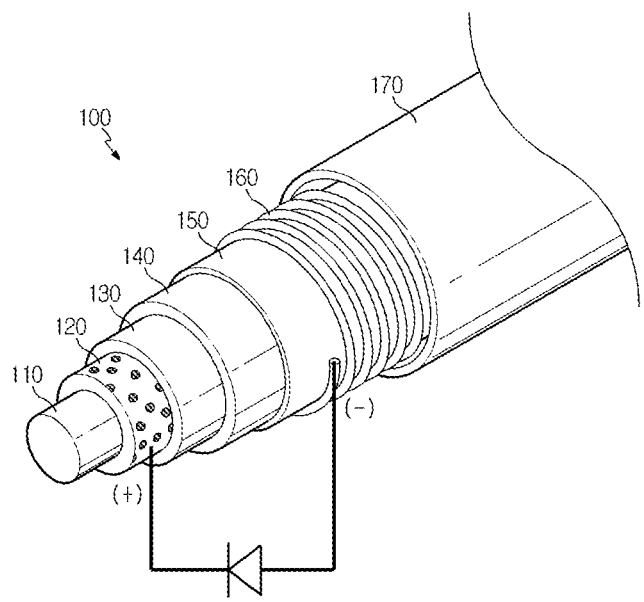
FIG. 4 is a schematic view of a connector having a diode which is electrically connected between an inner current collector and an outer current collector in a cable-type secondary battery according to one embodiment of the present invention, which is shown by a symbol.

Also, FIGS. 3 and 4 are a schematic view showing a connector having a diode which is electrically connected between an inner current collector and an outer current collector in a cable-type secondary battery according to one embodiment of the present invention, which are shown by a symbol.

Referring to FIGS. 1 and 2, a cable-type secondary battery 100 capable of wireless charge, which is configured to have a horizontal cross section of a predetermined shape and to extend longitudinally, comprises a core 110 for supplying lithium ions, which comprises an electrolyte; an inner electrode comprising an open-structured inner current collector 120 surrounding the outer surface of the core 110 for supplying lithium ions, and an inner electrode active material layer 130 surrounding the surface of the inner current collector 120; a separation layer 140 surrounding the outer surface of the inner electrode to prevent a short circuit between electrodes; an outer electrode surrounding the outer surface of the separation layer 140 and comprising an outer electrode active material layer 150 and an outer current collector 160 configured in a wound form; and a connector (not shown) having a diode which electrically connects the inner current collector and the outer current collector therebetween.

As used herein, the term 'a horizontal cross section' may refer to a circular or polygonal shape. The circular shape includes circles having a perfectly symmetrical geometric structure and ovals having an asymmetrical structure. The polygonal shape is not limited to any particular form, but examples thereof may include triangular, tetragonal, pentagonal and hexagonal forms.

The cable-type secondary battery of the present invention has a horizontal cross section with a linear structure which extends in the longitudinal direction, and thus has flexibility, so it can freely change in shape.

Conventional cable-type secondary batteries have an electrolyte layer which is interposed between an inner electrode and an outer electrode. In order for the electrolyte layer to isolate the inner electrode from the outer electrode and prevent a short circuit, the electrolyte layer is required to be made of gel-type polymer electrolytes or solid polymer electrolytes having a certain degree of mechanical properties. However, such gel-type polymer electrolytes or solid polymer electrolytes fail to provide superior performances as a source for lithium ions, so an electrolyte layer made of such should have an increased thickness so as to sufficiently provide lithium ions. Such a thickness increase in the electrolyte layer widens an interval between the electrodes to cause resistance increase, thereby deteriorating battery performances.

In contrast, the cable-type secondary battery 100 of the present invention has the core 110 for supplying lithium ions, which comprises an electrolyte, and the inner electrode 120 of the present invention has the open-structured inner current collector, which allows the electrolyte of the core 110 for supplying lithium ions to pass through the inner current collector 120 to reach the inner electrode active material layer 130 and the outer electrode active material layer 150. Accordingly, it is not necessary to excessively increase the thickness of an electrolyte layer. Also, an electrolyte layer may not be adopted as an essential component, and therefore, only a separator may be optionally used. Thus, the cable-type secondary battery of the present invention has the core 110 for supplying lithium ions, which comprises an electrolyte, to facilitate the penetration of the electrolyte into an electrode active material, and eventually facilitate the supply and exchange of lithium ions in electrodes, thereby exhibiting superior capacity and cycle characteristics.

Also, the cable-type secondary battery of the present invention can be applied in a wireless charging method generating a current by using external magnetic field, thereby being conveniently charged as compared with conventional batteries which are charged with wires.

The wireless charging method may be carried out by using microwaves or by applying electromagnetic induction.

In the present invention, it is preferred that the electromagnetic induction is applied to form a magnetic field by currents flowing in external devices. The magnetic field thus formed generates an induced current in the outer current collector of the cable-type secondary battery, and then the induced current can charge the cable-type secondary battery.

In addition, in the present invention, the outer current collector configured in a wound wire form or a wound sheet form acts as a current of electrodes and also as a wireless charger, thereby simplifying battery configuration. Also, the outer current collector is overall comprised in a wound form within the battery, which can overcome the problem of local charge caused by the shape of conventional cable-type batteries.

Referring to FIGS. 3 and 4, in order to achieve good wireless charge and discharge, the cable-type secondary battery of the present invention comprises a connector having a diode which electrically connects the inner current collector and the outer current collector therebetween. The diode of the connector is reversely connected from a high potential current collector (a cathode current collector) being the inner current collector or the outer current collector to a low potential current collector (an anode current collector) being the outer current collector or the inner current collector.

That is, when the inner electrode is a cathode and the outer electrode is an anode, the diode of the connector is reversely connected from the inner current collector to the outer current collector. Alternatively, when the outer electrode is a cathode and the inner electrode is an anode, the diode of the connector is reversely connected from the outer current collector to the inner current collector. Thus, the diode is used to allow good charge and discharge.

Meanwhile, the core 110 for supplying lithium ions comprises an electrolyte, and examples of the electrolyte may include, but are not particularly limited to, a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PMMA, PAN, or PVAc; and a solid electrolyte using PEO, polypropylene oxide (PPO), polyether imine (PEI), polyethylene sulphide (PES), or polyvinyl acetate (PVAc).

The electrolyte further comprises a lithium salt, and the preferred examples of the lithium salt include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and the like. Also, the core 110 for supplying lithium ions may consist of only an electrolyte, and in the case of a liquid electrolyte, a porous carrier may be used together.

The inner current collector of the present invention is in an open-structured form to facilitate the penetration of the electrolyte of the core for supplying lithium ions therein. The term 'open-structured' used herein means that a structure has an open boundary surface through which a substance may be transferred freely from the inside of the structure to the outside thereof. Such an open-structured form may be any forms if it can facilitate the penetration of an electrolyte.

In FIGS. 1 and 2, the open-structured inner current collector is shown in the form of a mesh 120 or a wound wire 220, but is not limited thereto. Alternatively, a wound sheet form of an open-structured inner current collector may also be used.

The inner current collector 120, 220 is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

The current collector serves to collect electrons generated by electrochemical reaction of the active material or to supply electrons required for the electrochemical reaction. In general, the current collector is made of a metal such as copper or aluminum. Especially, when the current collector is made of a non-conductive polymer treated with a conductive material on the surface thereof or a conductive polymer, the current collector has a relatively higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), silver, palladium, nickel, etc. The conductive polymer may include polyacetylene, polyaniline, polypyrrole, polythiophene, polysulfurnitride, etc. However, the non-conductive polymer used for the current collector is not particularly limited to its kinds.

In the present invention, the inner electrode active material layer 130 is formed on the surface of the inner current collector 120, to surround the outer surface of the surface of the inner current collector 120. Thereby, the open structure of the inner current collector 120 may not be exposed to the outside of the inner electrode active material layer 130, or may be exposed to the outside of the inner electrode active material layer 130. For example, an active material layer may be formed on the surface of a wound wire form of an inner current collector, or a wire form of an inner current collector having an electrode active layer formed thereon may be wound.

Meanwhile, the separation layer may be an electrolyte layer or a separator.

The electrolyte layer serving as an ion channel may be made of a gel-type polymer electrolyte using PEO, PVdF, PVdF-HFP, PMMA, PAN or PVAC, or a solid electrolyte using PEO, polypropylene oxide (PPO), polyethylene imine (PEI), polyethylene sulfide (PES) or polyvinyl acetate (PVAc). The matrix of the solid electrolyte is preferably formed using a polymer or a ceramic glass as the backbone. In the case of typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a porous support or a cross-linked polymer to improve poor mechanical properties. The electrolyte layer of the present invention can serve as a separator, and thus an additional separator may be omitted.

The electrolyte layer of the present invention may further comprise a lithium salt. The lithium salt can improve an ionic conductivity and response time. Non-limiting examples of the lithium salt may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, and lithium tetraphenylborate.

Examples of the separator may include, but is not limited to, a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; or a porous substrate made of a mixture of inorganic particles and a binder polymer. Among these, in order for the lithium ions of the core for supplying lithium ions to be transferred to the outer electrode, it is preferred to use a non-woven fabric separator corresponding to the porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates.

In the present invention, the outer electrode may be formed in various embodiments depending on the disposition of the outer electrode active material layer and the outer current collector, which come into contact with the separation layer.

As shown in FIG. 1, the outer electrode has the outer electrode active material layer 150 formed to surround the outer surface of the separation layer 140, and the outer current collector 160 formed by winding to surround the outer surface of the outer electrode active material layer 150.

Also, according to other embodiments of the present invention, the outer electrode of the cable-type secondary battery may be formed in a structure having the outer current collector formed to by winding surround the outer surface of the separation layer, and the outer electrode active material layer formed to surround the outer surface of the outer current collector; a structure having the outer current collector formed by winding to surround the outer surface of the separation layer, and the outer electrode active material layer formed to surround the outer surface of the outer current collector and come into contact with the separation layer; or a structure having the outer electrode active material layer formed to surround the outer surface of the separation layer, and the outer current collector formed by winding to be included inside the outer electrode active material layer by being covered therein and to surround the outer surface of the separation layer with spacing apart therefrom.

In the present invention, the outer current collector is not particularly limited to its forms if it can receive a magnetic field formed on the outside to generated a current, thereby allowing wireless charge, but is preferably in the form of a wound wire or a wound sheet. The outer current collector may be made of stainless steel, aluminum, nickel, titanium, sintered carbon, or copper; stainless steel treated with carbon, nickel, titanium or silver on the surface thereof; or an aluminum-cadmium alloy.

The outer current collector may have a thickness of 1 to 500 µm, and may also be wound in a frequency of 0.1 to 100 times per 1 mm of a unit length in the cable-type secondary battery.

In general, a secondary coil may be affected by its cross sectional area and its winding frequency. Accordingly, when the outer current collector in the form of a secondary coil satisfies such numerical ranges, an induced current is effectively generated to allow the wireless charge of the cable-type secondary battery.

The inner electrode may be an anode and the outer electrode may be a cathode. Alternatively, the inner electrode may be a cathode and the outer electrode may be an anode.

In the present invention, the electrode active material layer allows ions to move through the current collector, and the movement of ions is caused by the interaction of ions such as intercalation/deintercalation of ions into and from the electrolyte layer.

Such an electrode active material layer may be divided into an anode active material layer and a cathode active material layer.

Specifically, when the inner electrode is an anode and the outer electrode is a cathode, the inner electrode active material layer becomes an anode active material layer and may be made of an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and mixtures thereof, and the outer electrode active material layer becomes a cathode active material layer and may be made of an active material selected from the group consisting of LiCoO$_2$, LiNiO$_2$, LiMn$_2$O$_4$, LiCoPO$_4$, LiFePO$_4$, LiNiMnCoO$_2$, LiNi$_{1-x-y-z}$Co$_x$M1$_y$M2$_z$O$_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and mixtures thereof.

Alternatively, when the inner electrode is a cathode and the outer electrode is an anode, the inner electrode active material layer becomes a cathode active material layer and the outer electrode active material layer becomes an anode active material layer.

Also, the cable-type secondary battery of the present invention has a protection coating. The protection coating is an insulator and is formed to surround the outer current collector, thereby protecting the electrodes against moisture in the air and external impacts. The protection coating may be made of conventional polymer resins, for example, PVC, HDPE or epoxy resins.

Hereinafter, a cable-type secondary battery according to one embodiment of the present invention and the manufacture thereof will be briefly explained with reference to FIG. 2.

A cable-type secondary battery 200 according to one embodiment of the present invention comprises a core 210 for supplying lithium ions, which comprises an electrolyte; an inner electrode comprising an open-structured inner current collector 220 surrounding the outer surface of the core 210 for supplying lithium ions, and an inner electrode active material layer 230 surrounding the surface of the inner current collector 220; a separation layer 240 surrounding the outer surface of the inner electrode to prevent a short circuit between electrodes; and an outer electrode comprising an outer electrode active material layer 250 surrounding the outer surface of the separation layer 240 and an outer current collector 260 configured in a wound form and surrounding the outer surface of the outer electrode active material layer 250.

First, a polymer electrolyte is provided in the form of a wire using an extruder to prepare the core 210 for supplying lithium ions. Also, the core 210 for supplying lithium ions may be formed by providing a hollow inner electrode and introducing a non-aqueous electrolyte solution in the center of the inner electrode, or may be formed by providing a battery assembly comprising a protection coating and all, and introducing a non-aqueous electrolyte solution in the center of the inner electrode support comprised in the battery assembly. Alternatively, the core 210 for supplying lithium ions may be prepared by providing a wire-form carrier made of a sponge material and introducing a non-aqueous electrolyte solution thereto.

Then, a wire form of an inner current collector 220 is provided and wound on the core 210 for supplying lithium ions, and an inner electrode active material layer 230 is formed by way of coating on the surface of the inner current collector 220 in the wound wire form. The coating may be carried out by various conventional methods, for example, by an electroplating process or an anodic oxidation process. Also, in order to maintain constant intervals, an electrode slurry containing an active material may be discontinuously applied by way of an extrusion-coating using an extruder. In addition, the electrode slurry containing an active material may be applied by way of dip coating or extrusion-coating using an extruder.

Subsequently, a separation layer 240 consisting of a polymer electrolyte layer is formed to surround the inner electrode active material layer 230. The method for forming separation layer 240 as an electrolyte layer is not particularly limited, but an extrusion coating method is preferably used to facilitate the manufacturing process due to the nature of the linear cable-type secondary battery.

On the outer surface of the separation layer 240 formed by the coating of an electrolyte, an outer electrode active material layer 250 is formed by way of coating. The coating method of the inner electrode active material layer 230 may be identically applied to the outer electrode active material layer 250.

Then, an outer current collector in the form of a wire is provided and wound on the outer surface of the outer electrode active material layer 250 to form an outer current collector 260 in the form of a wound wire. In the present invention, as the outer current collector, a wound sheet form of a current collector may be used. At this time, the outer electrode active material layer may be first formed on the outer current collector, followed by applying on the separation layer, to form the outer electrode. For example, in the case of the wound sheet-formed current collector, the outer electrode active material layer may be first formed on a sheet-formed current collector, followed by cutting into a piece having a predetermined size, to prepare a sheet-formed outer electrode. Then, the prepared sheet-formed outer electrode may be wound on the outer surface of the separation layer so that the outer electrode active material layer comes into contact with the separation layer, to form the outer electrode on the separation layer.

As another method, in the formation of the outer electrode, the outer current collector may be first formed to surround the outer surface of the separation layer, and then followed by forming the outer electrode active material layer to surround the outer surface of the outer current collector.

Meanwhile, in the case that the outer electrode has a structure having the outer current collector formed to surround the outer surface of the separation layer, and the outer electrode active material layer formed to surround the outer surface of the outer current collector and to come into contact with the separation layer, first, an outer current collector, for example, in the form of a wire or sheet, is wound on the outer surface of the separation layer. The winding method is not particularly limited. For example, in the case of the wire-formed current collector, the winding may be carried out by using a winding machine on the outer surface of the separation layer. Then, the outer electrode active material layer is formed by way of coating on the outer surface of the wound wire- or sheet-formed outer current collector so that the outer electrode active material layer surrounds the outer current collector and comes into contact with the separation layer.

Also, in the case that the outer electrode has a structure having the outer electrode active material layer formed to surround the outer surface of the separation layer, and the outer current collector formed to be included inside the outer electrode active material layer by being covered therein and to surround the outer surface of the separation layer with spacing apart therefrom, first, on the outer surface of the separation layer, a part of the outer electrode active material layer to be finally obtained is formed, on which the outer current collector is formed to surround the part of the outer electrode active material layer, and then the outer electrode active material layer is further formed on the outer current collector to completely cover the outer current collector. Thereby, the outer current collector is disposed inside the outer electrode active material layer with spacing apart from the separation layer, to improve an electric contact between the current collector and the active material, thereby enhancing battery characteristics.

Next, a connector having a diode which electrically connects the inner current collector and the outer current collector is connected between the inner current collector and the outer current collector therebetween.

Finally, the protection coating 270 is formed to surround the outer surface of the electrode assembly. The protection coating 270 is an insulator and is formed on the outermost surface for the purpose of protecting the electrodes against moisture in the air and external impacts. As the protection coating 270, conventional polymer resins, for example, PVC, HDPE and epoxy resins may be used.

Hereinafter, another embodiment of the present invention will be briefly explained with reference to FIGS. 5 and 6.

Figure 5:
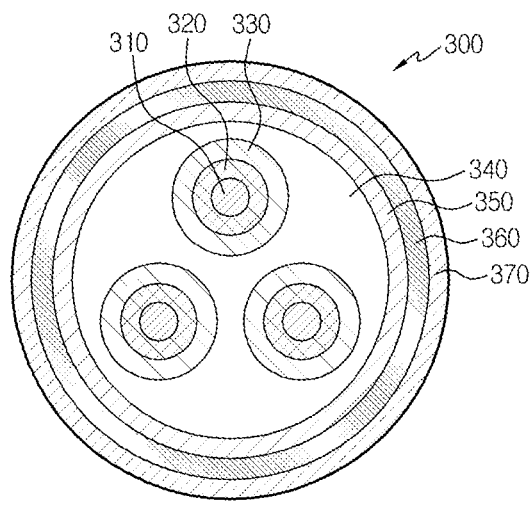
FIG. 5 is a cross-sectional view showing a cable-type secondary battery having multiple inner electrodes in accordance with one embodiment of the present invention.

Referring to FIG. 5, a cable-type secondary battery 300 according to one embodiment of the present invention comprises two or more cores 310 for supplying lithium ions, which comprise an electrolyte; two or more inner electrodes arranged in parallel to each other, each inner electrode comprising an open-structured inner current collector 320 surrounding the outer surface of each core 310 for supplying lithium ions, and an inner electrode active material layer 330 surrounding the surface of the inner current collector 320; a separation layer 340 surrounding the outer surface of the inner electrode to prevent a short circuit between electrodes; an outer electrode surrounding the outer surface of the separation layer 340 and comprising an outer electrode active material layer 350 and an outer current collector 360 configured in a wound form; and a connector having a diode which electrically connects the inner current collector 320 and the outer current collector 360 therebetween.

In the cable-type secondary battery having multiple inner electrodes shown in FIG. 5, the outer electrode may be taken in various structures as mentioned above.

Figure 6:
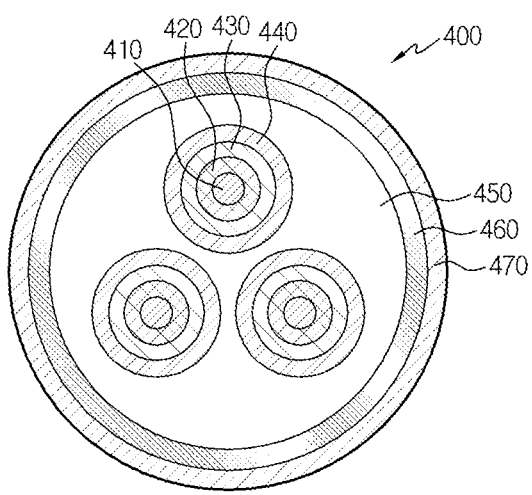
FIG. 6 is a cross-sectional view showing a cable-type secondary battery having multiple inner electrodes, the inner electrodes each having a separation layer, in accordance with one embodiment of the present invention.

Further, referring to FIG. 6, a cable-type secondary battery 400 according to one embodiment of the present invention comprises two or more cores 410 for supplying lithium ions, which comprise an electrolyte; two or more inner electrodes arranged in parallel to each other, each inner electrode comprising an open-structured inner current collector 420 surrounding the outer surface of each core 410 for supplying lithium ions, an inner electrode active material layer 430 surrounding the surface of the inner current collector 420, and a separation layer 440 surrounding the outer surface of the inner electrode active material layer 430 to prevent a short circuit between electrodes; an outer electrode surrounding the outer surface of the inner electrodes and comprising an outer electrode active material layer 450 and an outer current collector 460 configured in a wound form; and a connector having a diode which electrically connects the inner current collector and the outer current collector therebetween.

The outer electrode may be taken in various structures, including the structure having the outer electrode active material layer formed to surround the outer surface of the inner electrodes, and the outer current collector formed by winding to surround the outer surface of the outer electrode active material layer, for example, a structure having the outer current collector formed by winding to surround the outer surface of the inner electrodes, and the outer electrode active material layer formed to surround the outer surface of the outer current collector; a structure having the outer current collector formed by winding to surround the outer surface of the inner electrodes, and the outer electrode active material layer formed to surround the outer surface of the outer current collector and to come into contact with the inner electrodes; or a structure having the outer electrode active material layer formed to surround the outer surface of the inner electrodes, and the outer current collector formed by winding to be included inside the outer electrode active material layer by being covered therein and to surround the outer surface of the inner electrodes with spacing apart therefrom.

The cable-type secondary batteries 300 and 400 comprise a connector having a diode which electrically connects the inner current collector and the outer current collector therebetween, as already mentioned, so as to achieve wireless charge and discharge in the desired degree. The diode of the connector is reversely connected from a high potential current collector (a cathode current collector) being the inner current collector or the outer current collector to a low potential current collector (an anode current collector) being the outer current collector or the inner current collector.

Such cable-type secondary batteries 300 and 400 have the inner electrode consisting of multiple electrodes, thereby allowing controlling the balance between a cathode and anode and preventing a short circuit.

What is claimed is:

1. A cable-type secondary battery capable of wireless charge, configured to have a horizontal cross section of a predetermined shape and to extend longitudinally and comprising:
    a core for supplying lithium ions, which comprises an electrolyte;
    an inner electrode comprising an open-structured inner current collector surrounding the outer surface of the core for supplying lithium ions, and an inner electrode active material layer surrounding the surface of the inner current collector;
    a separation layer surrounding the outer surface of the inner electrode to prevent a short circuit between electrodes;
    an outer electrode surrounding the outer surface of the separation layer and comprising an outer electrode active material layer and an outer current collector configured in a wound form; and
    a connector having a diode which electrically connects the inner current collector and the outer current collector therebetween.

2. The cable-type secondary battery capable of wireless charge according to claim 1, wherein the diode of the connector is reversely connected from a high potential current collector being the inner current collector or the outer current collector to a low potential current collector being the outer current collector or the inner current collector.

3. The cable-type secondary battery capable of wireless charge according to claim 2, wherein when the inner electrode is a cathode and the outer electrode is an anode, the diode of the connector is reversely connected from the inner current collector to the outer current collector, or
    when the outer electrode is a cathode and the inner electrode is an anode, the diode of the connector is reversely connected from the outer current collector to the inner current collector.

4. The cable-type secondary battery capable of wireless charge according to claim 1, wherein the electrolyte is selected from a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PMMA, PAN, or PVAc; and a solid electrolyte using PEO, polypropylene oxide (PPO), polyether imine (PEI), polyethylene sulphide (PES), or polyvinyl acetate (PVAc).

5. The cable-type secondary battery capable of wireless charge according to claim 1, wherein the electrolyte further comprises a lithium salt.

6. The cable-type secondary battery capable of wireless charge according to claim 5, wherein the lithium salt is selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

7. The cable-type secondary battery capable of wireless charge according to claim 1, wherein the open-structured inner current collector is in the form of a wound wire, a wound sheet or a mesh.

8. The cable-type secondary battery capable of wireless charge according to claim 1, wherein the inner current collector is made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

9. The cable-type secondary battery capable of wireless charge according to claim 8, wherein the conductive material is selected from polyacetylene, polyaniline, polypyrrole, polythiophene, polysulfurnitride, indium tin oxide (ITO), silver, palladium, nickel, and a mixture thereof.

10. The cable-type secondary battery capable of wireless charge according to claim 8, wherein the conductive polymer is selected from polyacetylene, polyaniline, polypyrrole, polythiophene, polysulfurnitride, and a mixture thereof.

11. The cable-type secondary battery capable of wireless charge according to claim 1, wherein the separation layer is an electrolyte layer or a separator.

12. The cable-type secondary battery capable of wireless charge according to claim 11, wherein the electrolyte layer comprises an electrolyte selected from a gel polymer electrolyte using PEO, PVdF, PMMA, PAN, or PVAc; and a solid electrolyte using PEO, polypropylene oxide (PPO), polyether imine (PEI), polyethylene sulphide (PES), or polyvinyl acetate (PVAc).

13. The cable-type secondary battery capable of wireless charge according to claim 11, wherein the electrolyte layer further comprises a lithium salt.

14. The cable-type secondary battery capable of wireless charge according to claim 13, wherein the lithium salt is selected from $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

15. The cable-type secondary battery capable of wireless charge according to claim 11, wherein the separator is a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; or a porous substrate made of a mixture of inorganic particles and a binder polymer.

16. The cable-type secondary battery capable of wireless charge according to claim 1, wherein in the outer electrode,
the outer electrode active material layer is formed to surround the outer surface of the separation layer, and the outer current collector is formed by winding to surround the outer surface of the outer electrode active material layer;
the outer current collector is formed by winding to surround the outer surface of the separation layer, and the outer electrode active material layer is formed to surround the outer surface of the outer current collector;
the outer current collector is formed by winding to surround the outer surface of the separation layer, and the outer electrode active material layer is formed to surround the outer surface of the outer current collector and come into contact with the separation layer; or
the outer electrode active material layer is formed to surround the outer surface of the separation layer, and the outer current collector is formed by winding to be included inside the outer electrode active material layer by being covered therein and to surround the outer surface of the separation layer with spacing apart therefrom.

17. The cable-type secondary battery capable of wireless charge according to claim 1, wherein the outer current collector is in the form of a wound wire or a wound sheet.

18. The cable-type secondary battery capable of wireless charge according to claim 1, wherein the outer current collector is made of stainless steel, aluminum, nickel, titanium, sintered carbon, or copper; stainless steel treated with carbon, nickel, titanium or silver on the surface thereof; or an aluminum-cadmium alloy.

19. The cable-type secondary battery capable of wireless charge according to claim 1, wherein the outer current collector has a thickness of 1 to 500 μm.

20. The cable-type secondary battery capable of wireless charge according to claim 1, wherein the outer current collector is wound in a frequency of 0.1 to 100 times per 1 mm of a unit length in the cable-type secondary battery.

21. The cable-type secondary battery capable of wireless charge according to claim 1, wherein the inner electrode is an anode and the outer electrode is a cathode, or the inner electrode is a cathode and the outer electrode is an anode.

22. The cable-type secondary battery capable of wireless charge according to claim 1, wherein when the inner electrode is an anode and the outer electrode is a cathode,
the inner electrode active material layer comprises an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and mixtures thereof, and
the outer electrode active material layer comprises an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and mixtures thereof.

23. The cable-type secondary battery capable of wireless charge according to claim 1, wherein when the inner electrode is a cathode and the outer electrode is an anode,
the inner electrode active material layer comprises an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and mixtures thereof, and
the outer electrode active material layer comprises an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and mixtures thereof.

24. A cable-type secondary battery capable of wireless charge, configured to have a horizontal cross section of a predetermined shape and to extend longitudinally and comprising:
two or more cores for supplying lithium ions, which comprise an electrolyte;
two or more inner electrodes arranged in parallel to each other, each inner electrode comprising an open-structured inner current collector surrounding the outer surface of each core for supplying lithium ions, and an inner electrode active material layer surrounding the surface of the inner current collector;

a separation layer surrounding the outer surface of the inner electrode to prevent a short circuit between electrodes;

an outer electrode surrounding the outer surface of the separation layer and comprising an outer electrode active material layer and an outer current collector configured in a wound form; and a connector having a diode which electrically connects the inner current collector and the outer current collector therebetween.

25. A cable-type secondary battery capable of wireless charge, configured to have a horizontal cross section of a predetermined shape and to extend longitudinally and comprising:

two or more cores for supplying lithium ions, which comprise an electrolyte;

two or more inner electrodes arranged in parallel to each other, each inner electrode comprising an open-structured inner current collector surrounding the outer surface of each core for supplying lithium ions, an inner electrode active material layer surrounding the surface of the inner current collector, and a separation layer surrounding the outer surface of the inner electrode active material layer to prevent a short circuit between electrodes;

an outer electrode surrounding the outer surface of the inner electrodes and comprising an outer electrode active material layer and an outer current collector configured in a wound form; and a connector having a diode which electrically connects the inner current collector and the outer current collector therebetween.

* * * * *